United States Patent [19]
Yoshida

[11] Patent Number: 5,552,896
[45] Date of Patent: Sep. 3, 1996

[54] DISK RECORDING/REPRODUCING APPARATUS AND DISKS APPLIED THEREIN

[75] Inventor: Tadao Yoshida, Kanagawa, Japan

[73] Assignee: Sony Corporation, Tokyo, Japan

[21] Appl. No.: 154,629

[22] Filed: Nov. 18, 1993

Related U.S. Application Data

[63] Continuation of Ser. No. 945,749, Sep. 16, 1992, abandoned.

[30] Foreign Application Priority Data

Sep. 27, 1991 [JP] Japan .................................. 3-275069

[51] Int. Cl.⁶ ............................... H04N 5/76; G11B 7/24
[52] U.S. Cl. .......................................... 358/342; 369/275.3
[58] Field of Search .................................... 358/341, 342, 358/343, 335, 310; 360/19.1; 369/54, 58, 44.29, 32, 275.2, 275.3

[56] References Cited

U.S. PATENT DOCUMENTS

| | | |
|---|---|---|
| 4,075,665 | 2/1978 | Borne et al. |
| 4,797,752 | 1/1989 | Giddings ................................. 358/342 |
| 4,937,686 | 6/1990 | Arai et al. ................................. 360/32 |
| 4,992,885 | 2/1991 | Yoshio ................................. 358/341 |
| 5,023,854 | 6/1991 | Satoh et al. ................................. 369/32 |
| 5,138,598 | 8/1992 | Sako et al. ................................. 369/47 |
| 5,263,588 | 9/1993 | Maeda et al. ................................. 369/54 |

FOREIGN PATENT DOCUMENTS

| | | | |
|---|---|---|---|
| 0463183A1 | 1/1992 | European Pat. Off. ........ | G11B 20/12 |
| 0472414A1 | 2/1992 | European Pat. Off. ........ | G11B 7/007 |
| WO91/11002 | 7/1991 | WIPO ............................. | G11B 20/12 |
| WO91/14265 | 9/1991 | WIPO ............................. | G11B 20/10 |

OTHER PUBLICATIONS

*Mini Disc System Technical Manual*, published Mar. 1992, Sony Corporation, Audio Development Group, Tokyo, Japan.
Mini Disc System, 1 page.

*Primary Examiner*—Tommy P. Chin
*Assistant Examiner*—Robert Chevalier
*Attorney, Agent, or Firm*—Limbach & Limbach L.L.P.; Philip M. Shaw, Jr.

[57] ABSTRACT

A disk recording/reproducing apparatus for recording data on a disk with addition data recorded in a playback only area of the disk along with recording data having the same data structure as that of data which can be recorded in a recording/reproducing area of the disk, thus making it possible to reproduce the addition data along with the recording data. Compressed data obtained by implementing, by using an ATRAC encoder 13, data compression to successively inputted digital data divided into clusters, with cluster connection sectors longer than an interleaving length provided at connection portions of each of the clusters, to implement interleaving processing of the recording data to record them into a recording/reproducing area of a magneto-optical disk 2, and to reproduce them by using an optical head 3. From a reproduction or playback only area of the magneto-optical disk 2, addition data are reproduced from sectors corresponding to the cluster connection sectors.

8 Claims, 5 Drawing Sheets

5,552,896

DISK RECORDING/REPRODUCING APPARATUS AND DISKS APPLIED THEREIN

This is a continuation application Ser. No. 07/945,749 filed on Sep. 16, 1992, now abandoned.

BACKGROUND OF THE INVENTION

1. Field of the Invention

This invention relates to a disk recording/reproducing apparatus adapted to implement bit compression processing to successively inputted data caused to be in a digital form to record/reproduce them through a disk.

2. Description of the Prior Art

Optical disks can have a recording capacity greater than that of magnetic disks by two to three binary orders of magnitude, and can make a higher speed access than that in a recording medium in a tape form. Further such optical disks can carry out recording/reproduction of data in a manner avoiding contact with a medium, thus advantageously providing excellent durability, etc. For these reason, optical disks have been frequently used in recent years. Of such optical disks, so called CDs (Compact Disks) are the most popularly known.

Meanwhile, in the case of attempting to provide, by using an optical disk, a portable recording/reproducing equipment, particularly a head phone stereo equipment of about so-called pocket size, or a recording and/or reproducing apparatus similar thereto, in existing CDs as described above, for example, there are standardized formats for a CD of a disk diameter of 12 cm and a CD of a disk diameter of 8 cm (so called a CD single type). However, in the case of the disk having a diameter of 12 cm, the outside dimension of the recording/reproducing apparatus becomes too large, resulting in poor portability. For this reason, it is conceivable to use a disk having a diameter of 8 cm or less. However, in the case of attempting to constitute a portable recording and/or reproducing apparatus or an apparatus of about a pocket size by using an optical disk having a diameter of about 8 cm or less, there are the following problems.

First, for standard CD format (CD-DA format) optical disk, on which stereo digital PCM audio signals having a sampling frequency of 44.1 KHz and subjected to 16 bit quantization are recorded, are supplied from the maker side, and only reproduction or playback is conducted on the user side, the reproduction or playback time (recording time) of the disk having a diameter of 8 cm is a short value of about 20 to 22 minutes even at the maximum, so the disk would be unable to entirely record a symphony of classical music. For the reproduction or playback time, about 74 minutes or more at the maximum, the same order as that of the 12 cm CD presently available, would be preferable. Further, in the CD-DA format, recording cannot be carried out on the user side. In addition, a non-contact optical pick-up device is easily affected by mechanical vibration, etc., so deviation in tracking and/or defocusing (deviation infocusing), etc. are apt to occur by vibration, etc. For this reason, in the case of carrying such equipment, very effective measures for suppressing bad influence on the reproducing operation due to deviation in tracking or defocusing, etc. are required.

Further, in a CD-MO format (format using a recordable magneto-optical disk) as an extended format of the standard CD format (CD-DA format), the recording/reproducing time of a disk having a diameter of 8 cm is disadvantageously a short time of about 20 to 22 minutes the same as that of the CD-DA format. In addition, the deviation in tracking and/or defocusing of an optical pick-up device resulting from mechanical vibration, etc. are apt to occur. For this reason, measures for preventing bad influence on the recording/reproducing operation resulting therefrom are required.

In a CD-I (CD-interactive) format, as a mode for recording/reproducing a bit-compressed digital audio signal, respective levels as shown in the following Table are standardized.

TABLE 1

| LEVEL | SAMPLING FREQUENCY | QUANTIZATION BIT NO. | BAND WIDTH | PLAYBACK TIME STEREO/MONAURAL |
|---|---|---|---|---|
| A | 37.8 kHz | 8 | 17 kHz | 2/4 |
| B | 37.8 kHz | 4 | 17 kHz | 4/8 |
| C | 18.9 kHz | 4 | 8.5 kHz | 8/16 |

As indicated in Table 1, when a disk recorded, e.g. in the B level mode is reproduced, a reproduced signal is obtained by bit-compressing a digital signal of the standard CD-DA format so that the signal density of the reproduced signal becomes equal to an approximately quadruple value (a value about four times greater than that of the original signal). Accordingly, for example, when all recording data are stereo audio compressed data, reproduction of a time four times (four channels) greater than the standard time can be carried out. As a result, even with an optical disk having a diameter of about 8 cm or less, recording/reproduction of about 70 minutes can be carried out.

Meanwhile, in the above-mentioned CD-I format, because a disk is rotationally driven at the same linear velocity as that of the standard CD-DA format, successive audio compressed data will be reproduced at a rate of 1/n recording units on the disk. Each such unit is called a block or sector. One block (sector) is comprised of 98 frames, and the period is 1/75 seconds. In this instance, n is the above-mentioned reproduction or playback time or a numeric value corresponding to bit compression ratio of data. For example, in the B level stereo mode, n is equal to 4. Accordingly, in the B level stereo mode, a data train in which ones of respective four sectors are respectively caused to serve as an audio sector as indicated below:

S D D D S D D D . . .

(S is an audio sector, and D is any other data sector) are recorded on a disk. It is to be noted that since, at the time of an actual recording, a predetermined encode processing (error correction coding processing and interleaving processing) similar to that for audio data of an ordinary CD format is implemented to the above-mentioned data train, data of the audio sectors S and data of the data sectors D are arranged in a distributed manner in recording sectors on the disk. Here, video data or computer data, can be recorded in any data sector D mentioned above. In the case where bit-compressed audio signals are recorded in the data sector D, a data train (S1, S2, S3, S4, S1, S2, S3, S4 . . . ) in which audio sectors S1–S4 of four channels are cyclically arranged in a successive manner will be subjected to encode processing and recorded on the disk.

In the case of recording/reproducing successive audio signals, the above-mentioned four channel audio signals, are connected in a successive manner from the first channel to the fourth channel, are used. By reproducing data of the first channel corresponding to the audio sector S1 from the disk innermost circumference up to the outermost circumference thereafter to return to the disk innermost circumference for a second time to reproduce in turn data of the second channel corresponding to the audio sector S2 up to the outermost circumference to reproduce data of the third channel corresponding to the next audio sector S3 from the disk innermost circumference to the outermost circumference for a second time to finally reproduce data of the fourth channel corresponding to the remaining audio sector S4 from the disk innermost circumference up to the outer circumference for a second time, continuous reproduction of a quadruple time will be carried out.

However, at several times during a continuous reproduction as described above, track jump operations of a long distance (returning from the outermost circumference to the inner circumference) are required. Since such track jump operations cannot be instantaneously carried out, there is the serious problem that reproduced data for that time is lost, so a reproduced sound is interrupted. Further, in order to attempt to record successive audio signals, it is impossible to record, e.g., a signal of the sector S2 alone by the relation of the interleaving processing at the time of recording. For this reason, interleaving processing of data of adjacent sectors S1 and S3, or interleaving processing of data of the peripheral sectors in addition thereto is required. As a result, it is necessary to rewrite signals in sectors already recorded. Accordingly, recording of such successive compressed audio data is very difficult.

OBJECTS & SUMMARY OF THE INVENTION

With such actual circumstances in view, this invention has been made and its object is to permit recording/reproduction of recording data having a data structure in which an extremely long convoluted interleaving processing is implemented.

Another object of this invention is to provide a disk recording/reproducing apparatus adapted so that a recording area for addition data is ensured in a reproduction or playback only area or a reproduction or playback disk where recording data of the same data structure of the above-mentioned recording data are recorded, thereby making it possible to reproduce addition data along with recording data.

A further object of this invention is to provide a reproduction or playback only disk having a recording area for addition data broader than that of a recording/reproducing disk.

A still further object of this invention is to provide a disk including a recording/reproducing region where recording/reproduction of recording data of a data structure in which an extremely long convoluted interleaving processing is implemented is carried out, and a recording area where recording data of the same data structure as that of the recording/reproducing area is recorded along with addition data.

To achieve the above-mentioned objects, in accordance with this invention, there is provided a disk recording/reproducing apparatus, comprising: memory means into which successively inputted data in a digital form are sequentially written, and from which the written inputted data are sequentially read out as recording data having a transfer rate higher than a transfer rate of the inputted data; recording/reproducing means for reading out recording data from the memory means in clusters each comprising a fixed number of sectors, with cluster connection sectors longer than an interleaving length for interleaving processing provided at connection portions of each cluster to enable independent interleaving processing of the recording data of each cluster, and for reproducing recorded data from the recording/reproducing area; and a reproducing means for reproducing recorded data and addition data from a playback only area, where said recorded data have been recorded in the playback only area in the same data format as that of data recorded in the recording/reproducing area and the addition data have been recorded in sectors corresponding to the cluster connection sectors; and a memory means into which reproduced data from the recording/reproducing means or the reproducing means are written, and from which the written reproduced data are sequentially read out as successive reproduced data.

A reproduction or playback only disk according to this invention is adapted so that recording data are divided into clusters, each comprising a fixed number of sectors, that cluster connection sectors longer than an interleaving length for interleaving processing are provided at connection sectors between respective clusters, that recording data to which interleaving processing have been implemented are recorded every cluster, and that addition data are recorded in advance in the cluster connection sectors. This reproduction or playback only disk may be reproduced by the above-mentioned disk recording/reproducing apparatus. In this case, the addition data may be still picture data.

Further, a disk according to this invention includes a recording/reproducing area for recording data divided into clusters wherein each of the clusters comprises a fixed number of sectors, including cluster connection sectors longer than an interleaving length provided at connection portions of the cluster, where said data may have undergone interleaving processing; and a reproduction or playback only area for recording data of the same data format as that recorded in the recording/reproducing area, including addition data in sectors corresponding to the cluster connection sectors. This disk may be recorded or reproduced by the above-mentioned recording/reproducing apparatus. Dummy data may be stored or recorded in the connection sector of the recording/reproducing area. The addition data can be still picture data.

In the disk recording/reproducing apparatus according to this invention, a memory means adapted so that successively inputted data in a digital form are written thereinto implements time-base processing to recording data by sequentially reading out inputted data as recording data having a transfer speed higher than a transfer rate of the inputted data. Further, a recording/reproducing means divides recording data read out from the memory means into clusters each having a fixed number of sectors including cluster connection sectors of length longer than an interleaving period for interleaving processing at connection portions of each cluster (to enable interleaving processing of the recording data of each cluster without affecting the recording data of any other cluster), and a reproducing means reproduces recorded data from the recording/reproducing area. By providing the cluster connection sectors in this way, recording data is separated into clusters. Further, the reproducing means of the disk recording/reproducing apparatus serves to reproduce recorded data and addition data from a reproduction or playback only area (in which recording data having the same data format as data recorded in the recording/reproducing area are recorded and in which addition data are recorded in sectors corresponding to the cluster connection sectors). In addition, reproduced data from the recording/reproducing means or the reproducing means are sequentially read out as successive reproduced data through the memory means.

Namely, the memory means implements time-axis expanding processing to the reproduced data.

Further, in the reproduction or playback only area of a disk according to this invention, cluster connection sectors longer than an interleaving length for interleaving processing, provided at connection portions of respective clusters of recording data, serve as a recording area for addition data.

Furthermore, in the disk according to this invention, recording data is divided into clusters each having a fixed number of sectors, each cluster including cluster connection sectors of length longer than an interleaving length at connection portions thereof. Thus, clusters of recording data which have undergone interleaving processing can be recorded in and reproduced from the disk's recording/reproducing area. In addition, from the disk's reproduction or playback only area, recording data having the same data format as that recorded in the recording/reproducing area can be reproduced along with addition data.

DESCRIPTION OF THE PREFERRED EMBODIMENT

Figure 1:
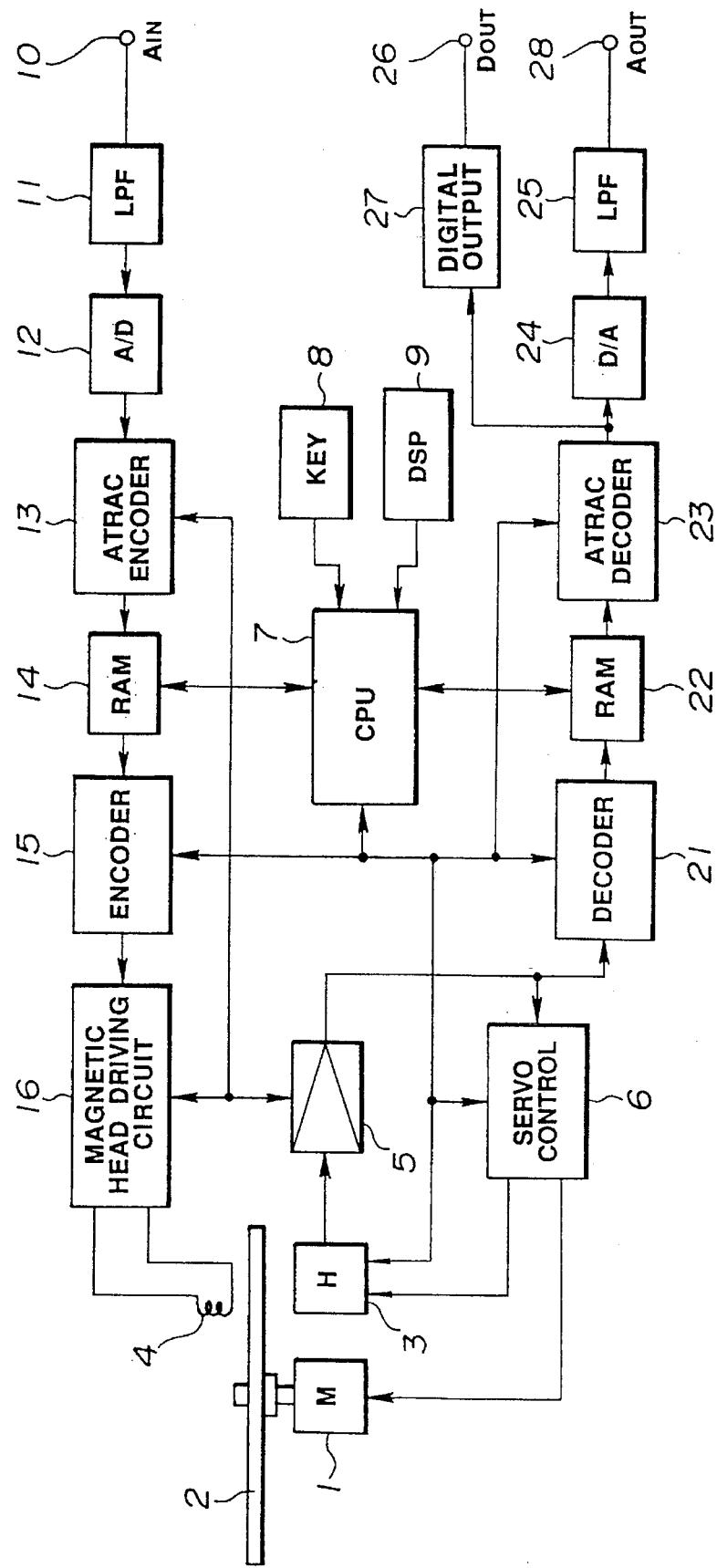
FIG. 1 is a block diagram showing an example of the configuration of an optical disk recording/reproducing apparatus according to an embodiment of this invention.

FIG. 1 is a circuit diagram showing, in a block form, the outline of the configuration of an optical disk recording/reproducing apparatus according to an embodiment of this invention.

Figure 2:
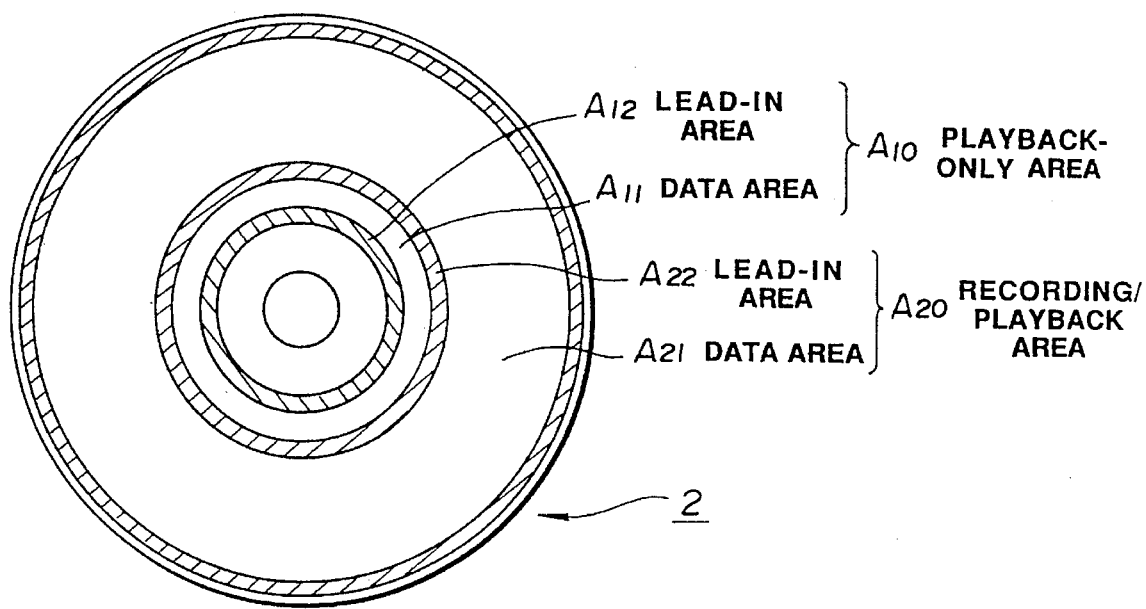
FIG. 2 is a plan view in a model form for explaining the structure of a magneto-optical disk used in the above-mentioned optical disk recording/reproducing apparatus.

In the optical disk recording/reproducing apparatus shown in FIG. 1, a magneto-optical disk having a recording/reproducing area where data can be recorded and reproduced, an optical disk for reproduction or playback only having a reproduction or playback only area for recording data, or a magneto-optical disk having both a recording/reproducing area where data can be recorded and reproduced and a playback only area for recording data may be used as a recording medium. Each such disk can be adapted so that it can be rotationally driven by a spindle motor 1. In the FIG. 1 example, a magneto-optical disk 2 (of the type shown in FIG. 2) having a playback only area $A_{10}$ and a recording/reproducing area $A_{20}$ provided outside the playback only area $A_{10}$ is rotationally driven by the spindle motor 1.

The playback only area $A_{10}$ of the magneto-optical disk 2 includes a data area $A_{11}$ where data such as playing information, etc. are recorded, and a lead-in area $A_{12}$ provided on the inner circumferential side thereof. In lead-in area $A_{12}$, TOC (Table of Contents) data indicating the recording position or recording content of the data area $A_{11}$ are recorded. In playback only area $A_{10}$, digital data are recorded in advance as presence and absence of pits corresponding to "1" and "0".

Further, the recording/reproducing area $A_{20}$ of the magneto-optical disk 2 includes a data area $A_{21}$ where data such as playing information, etc. are recorded, and a lead-in area $A_{22}$ provided on the inner circumferential side thereof. In this lead-in area $A_{22}$, TOC data indicating the recording position or the recording content of the data area $A_{21}$ are recorded. This recording/reproducing area $A_{20}$ serves as a magneto-optical recording medium area.

The optical disk recording/reproducing apparatus of this embodiment applies a modulated magnetic field to the magneto-optical disk 2 rotated by the spindle motor 1 with a laser beam being irradiated thereto by means of an optical head 3, for example, to thereby carry out recording (so-called magnetic modulation recording) of data along recording tracks of the recording/reproducing area $A_{20}$ of the magneto-optical disk 2, and to trace, by a laser beam, recording tracks of the playback only area $A_{10}$ and the recording/reproducing area $A_{20}$ of the magneto-optical disk 2 by means of the optical head 3 to thereby optically reproduce data.

Figure 3:
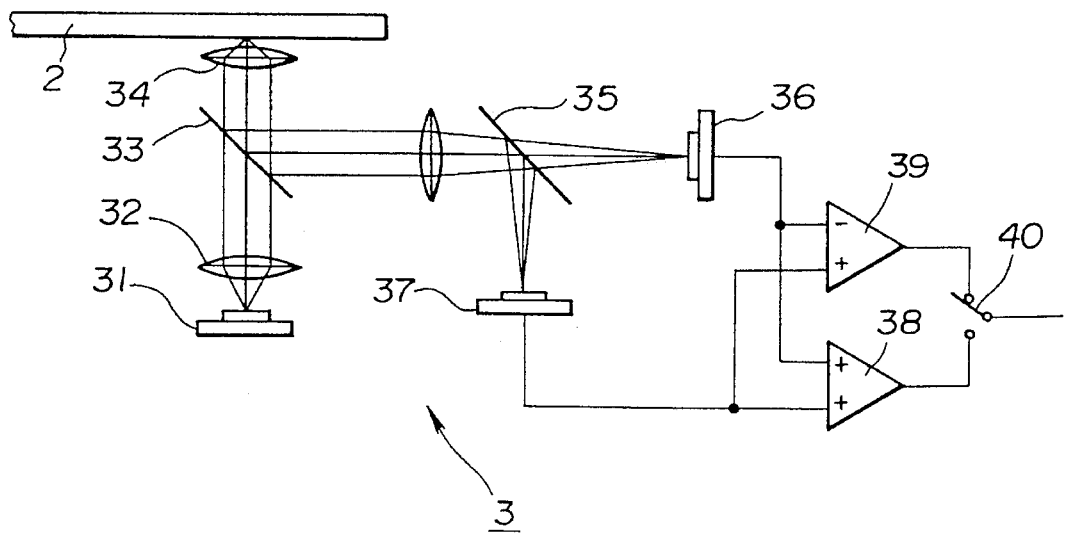
FIG. 3 is a schematic diagram showing the configuration of an optical head portion used in the above-mentioned optical disk recording/reproducing apparatus.

The optical head 3 is comprised, as shown in FIG. 3, for example, of a laser light source 31 such as a laser diode, etc., optical components such as a collimator lens 32, a beam splitter 33, an object lens 34, and a polarized beam splitter 35, etc., first and second photodetectors 36, 37 for detecting a light separated by the polarized beam splitter 35, a first signal synthesis element 38 for performing additive synthesis of respective detection outputs by these photodetectors 36, 37, a second signal synthesis element 39 for performing a subtractive synthesis of respective detection outputs, and the like. This optical head 3 is provided at the position opposite to a magnetic head 4 with the magneto-optical disk 2 being put therebetween. In the case of recording data into the recording/reproducing area $A_{20}$ of the magneto-optical disk 2, this optical head 3 irradiates a laser beam onto a target track of the magneto-optical disk 2 to which a modulated magnetic field corresponding to recording data is applied resulting from the fact that the magnetic head 4 is driven by a head driving circuit 16 of a recording system which will be described later to thereby carry out data recording by thermomagnetic recording. This optical head 3 also detects a reflected laser beam returning from the target track to thereby detect a focus error, e.g. by the so-called astigmatism method, and to detect a tracking error, e.g., by the so-called push-pull method. Further, when data is reproduced from the playback only area $A_{10}$ of the magneto-optical disk 2, this optical head 3 detects a change in a light quantity of a reflected light from a target track of the laser beam, thereby making it possible to provide a reproduced signal. Thus, such a reproduced signal obtained by carrying out additive synthesis of respective detection outputs by the photodetectors 36, 37 by using the first signal synthesis element 38 is outputted through a changeover switch 40. Further, when data is reproduced from the recording/reproducing area $A_{20}$ of the magneto-optical disk 2, this optical head 3 detects a difference in the polarization angles (Kerr rotational angles) of a reflected light from a target track of a laser beam, thereby making it possible to provide a reproduced signal. Thus, such a reproduced signal obtained by applying subtractive synthesis of respective detection outputs by the photodetectors 36, 37 by using the second signal synthesis element 39 is outputted through the changeover switch 40. Here, the above-mentioned changeover switch 40 is adapted so that switching control corresponding to respective operational modes is conducted by a system controller 7 which will be described later.

An output of the optical head 3 is delivered to an RF circuit 5 as shown in FIG. 1. This RF circuit 5 extracts a focus error signal or a tracking error signal from an output of the optical head 3 to deliver it to a servo control circuit 6, and binary-codes the reproduced signal to deliver the reproduced signal in binary form to decoder 21 of a reproducing system which will be described later.

The servo control circuit 6 comprises, e.g., a focus servo control circuit, a tracking servo control circuit, a spindle motor servo control circuit, and a sled servo control circuit, etc. The focus servo control circuit carries out focus control of the optical system of the optical head 3 so that the focus error signal becomes equal to zero. Moreover, the tracking servo control circuit carries out a tracking control of the optical system of the optical head 3 so that the tracking error signal becomes equal to zero. Further, the spindle motor servo control circuit controls the spindle motor 1 so that the magneto-optical disk 2 is rotationally driven at a predetermined rotational velocity (e.g. constant linear velocity). In addition, the sled servo control circuit moves the optical head 3 and the magnetic head 4 to a target track position of the magneto-optical disk 2 designated by the system controller 7. The servo control circuit 6 adapted for carrying out various control operations delivers, to the system controller 7, information indicating operating states of respective components controlled by the servo control circuit 6.

To the system controller 7, a key input operation unit 8 and a display unit 9 are connected. This system controller 7 carries out control of the recording system and the reproducing system in an operational mode designated by operation input information by the key input operation unit 8. Further, this system controller 7 controls the recording position or the reproducing position on the recording tracks that the optical head 3 and the magnetic head 4 trace, on the basis of address information every sector reproduced from the recording track of the magneto-optical disk 2.

The recording system of the optical disk recording/reproducing apparatus includes an A/D converter 12 supplied with an analog audio signal $A_{IN}$ through a low-pass filter 11 from an input terminal 10. The A/D converter 12 quantizes the audio signal $A_{IN}$ to form digital audio data of a data rate of 2 ch.×16 bits×44.1 KHz=1.4M bits/s. The digital audio data obtained from the A/D converter 12 are delivered to an ATRAC (Adaptive Transform Acoustic Coding) encoder 13.

This ATRAC encoder 13 analyzes 1.4M bit/s data rate digital audio data obtained by quantizing the audio signal $A_{IN}$ by using the A/D converter 12 so that a waveform on the time base is divided into about 1,000 components on the frequency base by the so-called orthogonal-transform processing with data of about 20 ms at the maximum being as one block to extract those components in order from frequency components considered to be important from a viewpoint of hearing sense to generate about 300K bits/s digital audio data. Namely, there is carried out a processing to compress the 1.4M bit/s data rate digital audio data to 300K bit/s data rate digital audio data which is about one fifth thereof. Thus, the transfer rate of data is converted from 75 sectors/sec. to about 15 sectors/sec. in the standard CD-DA format.

Data write and readout in the memory 14 are controlled by the system controller 7. This memory 14 is used as a buffer memory for temporarily storing compressed audio data delivered from the ATRAC encoder 13 to record it onto the disk according to need. Namely, the data transfer rate of compressed audio data delivered from the ATRAC encoder 13 is reduced to one fifth of the data transfer rate of 75 sectors/sec i.e., 15 sectors/sec. and such compressed data are successively written into the memory 14. Such compressed data can be provided if recording of one of five sectors is carried out. Since such recording every fifth sector is virtually impossible, recording successive in sector as described later is carried out. This recording is carried out in a burst at a data transfer rate of 75 seconds/sec. with a cluster comprised of a predetermined plural number of sectors (e.g., 32 sectors several sectors) through idle periods. Namely, in the memory 14, compressed audio data successively written at a low transfer rate of 15 (=75/5) sectors/sec. corresponding to the bit compression rate are read out in a burst at the transfer rate of 75 sectors/sec. as recording data. With respect to data read out and recorded, the overall data transfer rate including the recording idle periods is a low rate of 15 sectors/sec. but momentary data transfer rate within a time of the recording operation carried out in a burst is 75 sectors/sec.

Compressed audio data, i.e., recording data read out in a burst at the transfer rate of 75 sectors/sec. from the memory 14 is delivered to the encoder 15. Here, in the data train delivered from the memory 14 to the encoder 15, a unit in which data are successively recorded by a single recording is caused to be a cluster comprised of plural sectors (e.g., 32 sectors) and several cluster connection sectors arranged at the beginning and the end of the cluster mentioned above. Each cluster connection sector has a length set so that it is longer than an interleaving length at the encoder 15. Even if interleaving processing is carried out, such cluster connection sectors prevent the interleaving of data within one cluster from having influence on data of adjacent clusters.

Figure 4:
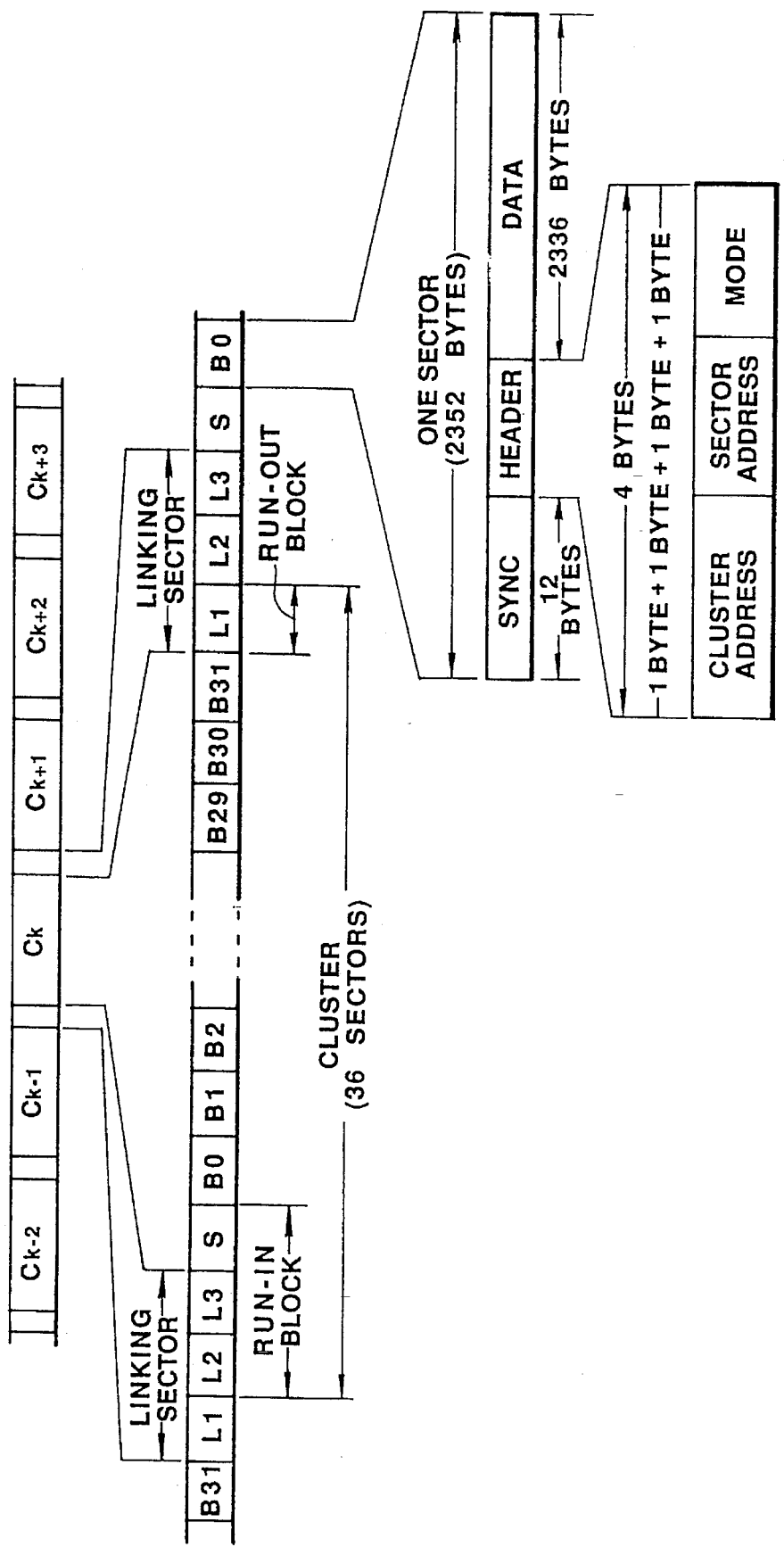
FIG. 4 is a view showing a format of the cluster structure of recording data recorded into the recording/reproducing area of the above-mentioned magneto-optical disk.

Namely, recording data (data read out from the memory 14) in this optical disk recording/reproducing apparatus are in a form such that recording data are divided into clusters each comprising a fixed number of sectors (or blocks), and that several cluster connection sectors for connection of clusters are arranged between these clusters. In actual terms, as shown in FIG. 4, a cluster C is comprised of 36 sectors in total, including 32 sectors (blocks) B0–B31, a single subcode sector S, and three connection (linking) sectors L1–L3, and is joined with adjacent clusters through the linking sectors L1–L3. Here, in the case of recording one cluster, e.g., the K-th cluster $C_K$, recording is carried out with 36 sectors including not only 32 sectors B0–B31 of the cluster $C_K$ and a single sub-code sector S, but also two sectors L2, L3 on the cluster $C_{K-1}$ side (run-in block) and a single sector L1 on the cluster $C_{K+1}$ side (run-out block) being as a unit. At this time, recording data of 36 sectors is sent from the memory 14 to the encoder 15. As the result of the fact that the interleaving processing is carried out at this encoder 15, sequencing of a distance of 108 frames (corresponding to 1.1 sectors) at the maximum is carried out. With respect to data within the cluster $C_K$ those data sufficiently fall within the range from the run-in block L2, L3 up to the run-out block L1, and have therefore no influence on other clusters $C_{K-1}$ on $C_{K-1}$. It is to be noted that, in the linking sectors L1–L3, dummy data, e.g., 0, etc. are arranged. Thus, bad influence on original data by the interleaving processing can be avoided.

By carrying out recording of such clusters, it has been unnecessary to take into consideration interference by the interleaving processing with other clusters. As a result, the data processing can be simplified to a high degree. Further, in the case where recording data fails to be normally recorded at the time of recording by defocusing, tracking deviation, other erroneous operations, or the like, re-recording can be carried out every cluster. In addition, in the case where effective data reading fails to be carried out at the time of reproduction, re-reading can be carried out every cluster.

The encoder 15 implements coding processing for error correction (addition of parity and interleaving processing) or EFM coding processing, etc., to recording data delivered in a burst as described above from the memory 14. The recording data to which coding processing has been implemented by the encoder 15 is delivered to the magnetic head driving circuit 16. This magnetic head driving circuit 16, to which the magnetic head 4 is connected, drives the magnetic head 4 so as to apply a modulated magnetic field corresponding to the recording data to the magneto-optical disk 2.

Further, the system controller 7 carries out a memory control as described above with respect to the memory 14, and carries out control of the recording position so as to successively record the recording data read out in a burst from the memory 14 by the memory control onto recording tracks of the magneto-optical disk 2. The control of the recording position is carried out by controlling, by using the system controller 7, the recording position of the recording data read out in a burst from the memory 14 to deliver a control signal for designating the recording position on the recording track of the magneto-optical disk 2 to the servo control circuit 6.

Namely, in this optical disk recording/reproducing apparatus, digital data obtained from the A/D converter 12 are audio PCM data having a sampling frequency of 44.1 KHz, a quantization bit number of 16 bits, and a data transfer rate of 75 sectors/sec. as described above. The audio PCM data are sent to the ATRAC encoder 13. As a result, compressed audio data having a data transfer rate of 15 sectors/sec. which is one fifth of the audio PCM data is outputted. Thus, compressed audio data successively outputted at a transfer speed of 15 sectors/sec. are delivered from the ATRAC encoder 13 to the memory 14.

Figure 5:
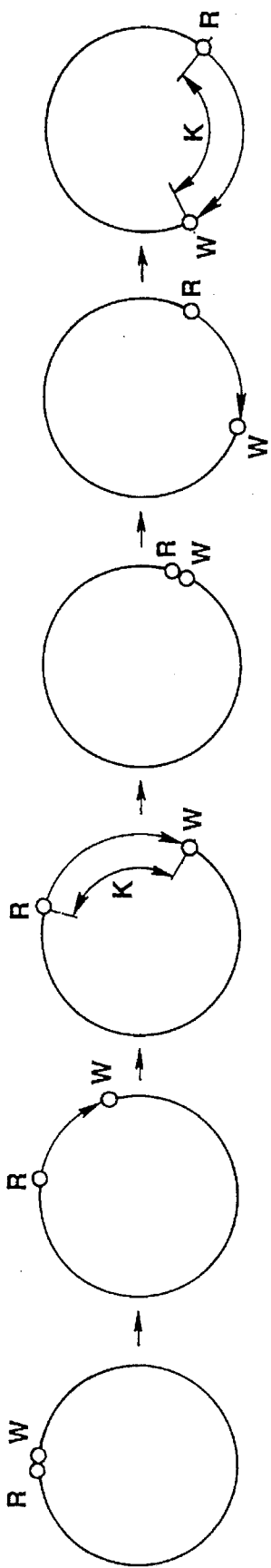
FIG. 5 is a view showing the state of a memory subjected to memory control in the recording system of the above-mentioned optical disk recording/reproducing apparatus.

The system controller 7 successively increments, as shown in FIG. 5, a write pointer W of the memory 14 at a transfer rate of 15 sectors/sec. to thereby successively write the compressed audio data into the memory 14 at a transfer rate of 15 sectors/sec. When the data quantity of the compressed audio data stored in the memory 14 exceeds a predetermined quantity K, the system controller 7 carries out a memory control so as to increment in a burst a read pointer R of the memory 14 at a transfer rate of 75 sectors/sec. to read out, from the memory 14, the compressed audio data as recording data at the transfer rate of 75 sectors/sec. by the predetermined quantity K.

By such memory control by the system controller 7, compressed audio data successively outputted, e.g. at a transfer rate of 15 sectors/sec. from the ATRAC encoder 13 is written into the memory 14 at the transfer rate of 15 sectors/sec. When the data quantity of the compressed audio data stored in the memory 14 exceeds the predetermined quantity K, the compressed audio data is read out from the memory 14 in a burst at a transfer rate of 75 sectors/sec. by the predetermined quantity K as recording data. Accordingly, it is possible to successively write inputted data into the memory 14 while ensuring a data write area having a capacity of more than a predetermined quantity in the memory 14 at all times.

The recording data which are read out in a burst from the memory 14 in a successive manner on recording tracks of the magneto-optical disk 2 by controlling the recording position on recording tracks of the magneto-optical disk 2 by using the system controller 7. As mentioned above, data write area having a capacity of more than a predetermined quantity is always ensured in the memory 14. Accordingly, if the operation of recording on the magneto-optical disk 2 is interrupted by the occurrence of a track jump or other incident due to a disturbance which is detected by the system controller 7, a recovery operation can be carried out while inputted data continue to be written into the data write area having a capacity of more than a predetermined quantity, and the inputted data can be recorded on the recording track of the magneto-optical disk 2 in a successive manner.

It is to be noted that header time data corresponding to a physical address of the sector are added to the compressed audio data every sector and recorded on the magneto-optical disk 2. In addition, Table-of-contents data indicating the recording area or the recording contents are recorded in a Table-of-contents area.

Figure 6:
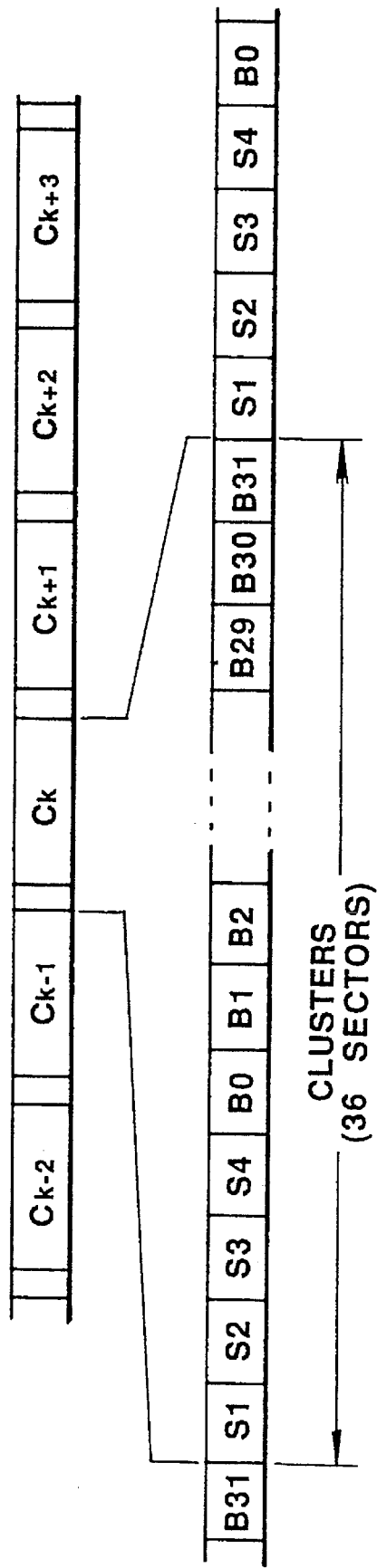
FIG. 6 is a view showing a format of the cluster structure of recording data recorded in the reproduction or playback only area of the above-mentioned magneto-optical disk.

When attention is now drawn to recording data recorded as presence or absence of pits in the playback only area $A_{10}$ of the magneto-optical disk 2, it is seen that one cluster C is comprised of 36 sectors in total, including 32 sectors (blocks) B0–B31 and four sub-data sectors S1–S4, as shown in FIG. 6, with connection sectors L1–L3 for recording data in the above-described recording/reproducing area $A_{20}$ shown in FIG. 4 being replaced by sub-data sectors S1–S4. Since there is no possibility that recording data in the playback only area $A_{10}$ will be rewritten, it is possible to use the connection sectors L1–L3 as sub-data sectors S. By providing four sub-data sectors S1–S4 every cluster in the playback only area $A_{10}$ in this way, it is possible to record, into the sub-data sectors S1–S4, addition data of a quantity four times greater than that of addition data recorded in each sub-data sector S of the recording/reproducing area $A_{20}$.

The reproducing system in this optical disk recording/reproducing apparatus will now be described.

This reproducing system serves to reproduce recording data which have been successively recorded on the recording tracks of the playback only area $A_{10}$ and the recording/reproducing area $A_{20}$ of the magneto-optical disk 2, and includes a decoder 21 supplied with a reproduced output obtained by tracing recording tracks of the magneto-optical disk 2 by a laser beam from the optical head 3, i.e., a reproduced signal of the playback only area $A_{10}$ outputted through the changeover switch 40 from the first signal synthesis element 38, or a reproduced signal of the recording/reproducing area $A_{20}$ outputted through the changeover switch 40 from the second signal synthesis element 39 under the state where the reproduced output, i.e., the reproduced signal of the region $A_{10}$ or the recording/reproducing area $A_{20}$ is binary-coded by the RF circuit 5.

The above-mentioned decoder 21 corresponds to the encoder 15 in the above-described recording system, and carries out processing such as decoding processing or EFM decoding processing as described above for error correction, etc. with respect to reproduced output binary-coded by the RF circuit 5 to reproduce the above-described compressed audio data at a transfer rate of 75 sectors/sec. The reproduced data obtained by the decoder 21 are delivered to the memory 22. The data write/read operations of the memory 22 are controlled by the system controller 7. Thus, reproduced data delivered at a transfer rate of 75 sectors/sec. from the decoder 21 are written into the memory 22 in a burst at a transfer rate of 75 sectors/sec. Further, from the memory 22, the reproduced data written in a burst at the transfer rate of 75 sectors/sec. are read out in a successive manner at a transfer rate of 15 sectors/sec.

The system controller 7 carries out such a memory control to write the reproduced data into the memory 22 at a transfer rate of 75 sectors/sec. and to read out in a successive manner the reproduced data from the memory 22 at the transfer rate of 15 sectors/sec.

Further, the system controller 7 carries out a memory control as described above with respect to the memory 22, and carries out control of the reproducing position so as to successively reproduce, from the recording track of the magneto-optical disk 2, the reproduced data written in a burst from the memory 22 by this memory control. The control of the reproducing position is carried out by controlling, by using the system controller 7, the reproducing position of the reproduced data read out in a burst from the memory 22 to deliver a control signal for designating the reproducing position on the recording track of the magneto-optical disk 2 to the servo control circuit 6.

Figure 7:
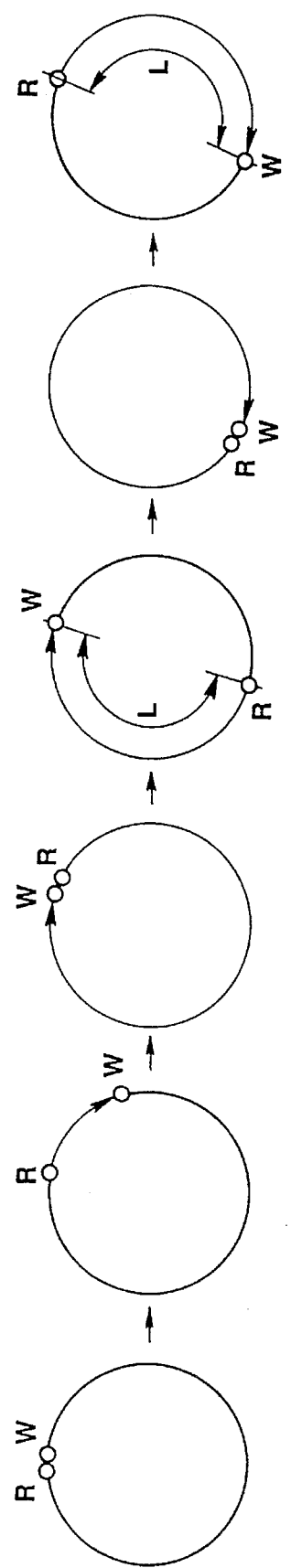
FIG. 7 is a view showing the state of a memory subjected to memory control in the reproducing system of the above-mentioned optical recording/reproducing apparatus.

Namely, the system controller 7 carries out a memory control, as shown in FIG. 7, to increment a write pointer W of the memory 22 at a transfer rate of 75 sectors/sec. to write the reproduced data into the memory 22 at a transfer rate of 75 sectors/sec and to successively increment the read pointer R of the memory 22 at a transfer rate of 15 sectors/sec. to successively read out the reproduced data from the memory 22 at a transfer rate of 15 sectors/sec. to stop the write operation when the write pointer W catches up with the read pointer R to increment in a burst the write pointer W of the memory 22 at a transfer rate of 75 sectors/sec. so as to carry out a write operation when the data quantity of the reproduced data stored in the memory 22 is below a predetermined quantity L.

By such memory control by the system controller 7, compressed audio data reproduced from recording tracks of the magneto-optical disk 2 are written into the memory 22 in a burst at a transfer rate of 75 sectors/sec and the compressed audio data are successively read out from the memory 14 as reproduced data at a transfer rate of 75 sectors/sec. Accordingly, while ensuring a data readout area having a capacity of more than a predetermined quantity L at all times in the memory 22, reproduced data can be successively read out from the memory 22. Further, the reproduced data read out in a burst from the memory 22 can be reproduced in a successive manner from the recording tracks of the magneto-optical disk 2 by controlling the reproducing position on the recording tracks of the magneto-optical disk 2 by using the system controller 7. In addition, since a data readout area having a capacity of more than a predetermined quantity L is ensured at all times in the memory 22 as described above, even in the case where the system controller 7 detects that a track jump, etc. takes place by disturbance, etc. to interrupt the reproducing operation with respect to the magneto-optical disk 2, it is possible to read out reproduced data from the data readout area having a capacity of more than a predetermined quantity L to successively provide an output of analog audio signals. Thus, a recovery processing operation can be carried out during that time period.

The compressed audio data obtained as reproduced data successively read out from the memory 22 at a transfer rate of 15 sectors/sec. are delivered to an ATRAC decoder 23. This ATRAC decoder 23 corresponds to the ATRAC encoder 13 of the recording system. When an operational mode is designated by the system controller 7, the ATRAC decoder 23 in this optical disk recording/reproducing apparatus reproduces digital audio data having a transfer rate of 75 sectors/sec. by expanding the compressed audio data to five times. The digital audio data thus obtained are delivered from the ATRAC decoder 23 to a D/A converter 24.

The D/A converter 24 converts digital audio data delivered from the ATRAC decoder 23 to data in an analog form to form an analog audio signal $A_{OUT}$. The analog audio signal $A_{OUT}$ obtained by the D/A converter 24 is outputted from an output terminal 26 through a low-pass filter 25.

It is to be noted that the reproducing system of the optical disk recording/reproducing apparatus of this embodiment has also a digital output function. By the ATRAC encoder 23, digital audio data is outputted from a digital output terminal 26 as a digital audio signal $D_{OUT}$ through a digital output encoder 27.

As stated above, in the optical disk recording/reproducing apparatus of this embodiment, recording data obtained by implementing, by using the ATRAC encoder 13, data compression to digital audio data obtained by digitizing, by using the A/D converter 12, analog audio signals $A_{IN}$ i.e., successive signals are divided into clusters each comprising a fixed number of sectors, including cluster connection sectors L1–L3 longer than an interleaving length provided at connection portions of respective clusters C, thus to implement interleaving processing thereto to record the data thus processed into the recording/reproducing area $A_{20}$ of the magneto-optical disk 2 every cluster. The recording/reproducing apparatus also reproduces recorded data from the recording/reproducing area $A_{20}$. Since recording data are separated into clusters with cluster connection sectors L1–L3 as described above, recording/reproduction of recording data having a data structure in which an extremely long convoluted interleaving processing is implemented can be carried out.

Further, from a playback only area $A_{10}$ where recording data have been recorded in accordance with the same data format as that of the recording/reproducing area $A_{20}$, and addition data have been recorded in four sub-code sectors S1–S4 which correspond to the cluster connection sectors L1–L3, recorded data and addition data are reproduced. Then, time-base expansion processing is implemented to reproduced data from the recording/reproducing means or the reproducing or playback means by using the reproduced data memory means. Thus, the recording area for addition data where recording data of the same data structure as that of the recording/reproducing area $A_{20}$ are recorded is ensured in the playback only area $A_{10}$, thus making it possible to reproduce addition data along with the recorded data.

Here, in the optical disk recording/reproducing apparatus of this embodiment, magneto-optical disk 2 including both the playback only area $A_{10}$ and the recording/reproducing area $A_{20}$ is used as a recording medium. However, there may be used a magneto-optical disk as a recording medium, in which the entire area is caused to be the recording/reproducing area $A_{20}$ without provision of the playback only area $A_{10}$ to record, into the recording/reproducing area $A_{20}$, recording data of the above-described data structure shown in FIG. 4 provided with cluster connection sectors longer than an interleaving length for interleaving processing provided at connection portions of respective clusters of recording data divided into clusters each having a fixed number of sectors, and to reproduce the recorded data from the recording/reproducing area $A_{20}$.

Further, there may be used a reproduction or playback only disk as a recording medium, in which the entire area is caused to be the playback only area $A_{10}$ without provision of the recording/reproducing area $A_{20}$, and recording data of the above-described data structure shown in FIG. 6 are recorded on the entire surface, thus to reproduce recorded data of the playback only area $A_{10}$. In the playback only optical disk, cluster connection sectors provided at connection portions of respective clusters of recording data divided into clusters each having a fixed number of sectors may be used as sub-data sectors to record in advance addition data thereinto, thereby making it possible to increase the quantity of recorded addition data. Thus, a playback only disk having a recording area for addition data broader than that of the magneto-optical disk, i.e., a recording/reproducing disk, can be provided.

It is to be noted various data such as still picture data, character data or speech data, etc. are conceivable as the addition data.

As is clear from the foregoing description, in the disk recording/reproducing apparatus according to this invention, recording data obtained by implementing time base compression processing to successively inputted data in a digital form by using memory means are divided into clusters each comprising a fixed number of sectors with cluster connection sectors longer than an interleaving length at connection portions of each of the clusters (to implement interleaving processing of the recording data so as to record clusters interleaved data into the recording/reproducing area, and to reproduce recorded data from the recording/reproducing area). As stated above, since recording data is separated into clusters by providing the cluster connection sectors, it is possible to carry out recording/reproduction of recording data having a data structure in which an extremely long convoluted interleaving processing is implemented. Further, the reproducing means reproduces recorded data and addition data from a playback only area in which recording data having the same data format as that recorded in the recording/reproducing area are recorded, where the addition data are recorded in sectors corresponding to the cluster connection sectors. Then, time-base expansion processing is implemented to reproduced data from the recording/reproducing means or the reproducing or playback means by using the reproduced data memory means. Thus, a recording region for addition data is ensured in the playback only area or playback only disk where recording data of the same data structure as that of the recording/reproducing area are recorded, thus making it possible to reproduce addition data along with recording data.

Accordingly, in accordance with this invention, there can be provided a disk recording/reproducing apparatus in which recording/reproduction of recording data having a data structure where an extremely long convoluted interleaving processing is implemented can be carried out, and a recording area for addition data is ensured in a playback only area or a playback only disk where recording data of the same data structure as that of the recording data are recorded, thus making it possible to reproduce addition data together with recorded data.

Further, in the playback only disk according to this invention, since addition data are recorded in cluster connection sectors longer than an interleaving length are provided at connection portions of each of the clusters, the quantity of recorded addition data can be increased. Accordingly, in accordance with this invention, there can be provided a playback only disk having a recording area for addition data broader than that of a recording/reproducing disk.

In addition, in the disk according to this invention, recording data are divided into clusters each having a fixed number of sectors, and cluster connection sectors longer than an interleaving length of an interleaving processing are provided at connection portions of respective clusters. Accordingly, it is possible to carry out recording/reproduction of data to which the interleaving processing has been implemented, to and from the recording/reproducing area. Further, from the playback only area, recording data of the same data format as that of the recording/reproducing area can be reproduced together with addition data. Accordingly, in accordance with this invention, there can be provided a disk including a recording/reproducing area where recording/reproduction of recording data of a data structure in which an extremely long convoluted interleaving processing is implemented is carried out, and a recording area where recording data of the same data structure as that of the recording/reproducing region are recorded along with addition data.

What is claimed is:

1. A disk recording/reproducing apparatus comprising:

memory means into which successively inputted data in a digital form are sequentially written, and from which the written inputted data are sequentially read out as recording data having a transfer rate higher than a transfer rate of the inputted data;

recording means for dividing the recording data read out from the memory means into clusters, each of the clusters having a fixed number of sectors, and interleaving the sectors at an interleaving length which is longer than one sector but less than two sectors, each of the clusters including cluster connection sectors in which dummy data are recorded and which are together longer than the interleaving length of the interleaving process at connection portions of each of the clusters, and recording the clusters in a recording/reproducing area of a disk;

reproducing means for reproducing recorded clusters from the recording/reproducing area and prerecorded data from recorded clusters that have been prerecorded in a playback only area of the disk where the recorded clusters prerecorded in the playback only area include data recorded in the same data format as that of the recording data recorded in the recording/reproducing area and wherein the recorded clusters prerecorded in the playback only area also include addition data recorded in sectors corresponding to the cluster connection sectors; and memory means into which reproduced data from the reproducing means are written and from which written reproduced data are sequentially read out as successive reproduced data.

2. A disk, including:

a recording/reproducing area on which recording data have been recorded, said recording data being divided into clusters each having a fixed number of sectors, each of the clusters including cluster connection sectors in which dummy data are recorded and which are together longer than an interleaving length of an interleaving process at connection portions of said each of the clusters, the interleaving length being longer than a sector but less than two sectors, wherein recording data to which the interleaving process has been implemented are recorded in portions of each of the clusters other than the cluster connection sectors; and a playback only area on which are recorded recording data having a format identical to that of the recording data recorded on said recording/reproducing area, and wherein addition data are recorded in sectors of the playback only area corresponding to said cluster connection sectors.

3. A disk as set forth in claim 2, wherein said addition data are still picture data.

4. A disk as set forth in claim 2, wherein each cluster is comprised of 32 sectors of recording data, a subcode sector, and three linking sectors, each sector being 2352 bytes of data.

5. A disk as set forth in claim 4, wherein each sector has 12 sync bytes, 2336 bytes of compressed audio data, and 4 bytes of data which includes cluster address data and sector address data.

6. A disk as set forth in claim 2, wherein each cluster is comprised of 32 sectors of recording data, a subcode sector, and three linking sectors, each sector being 2352 bytes of data.

7. A disk as set forth in claim 6, wherein each sector has 12 sync bytes, 2336 bytes of compressed audio data, and 4 bytes of data which includes cluster address data and sector address data.

8. A disk as set forth in claim 2, wherein the addition data includes at least one of character data, still picture data, and speech data.

* * * * *